Sept. 15, 1925.
M. MARTINOV
1,553,870
TWIN FURNACE BAKER'S OVEN
Filed Jan. 16, 1924   2 Sheets-Sheet 1
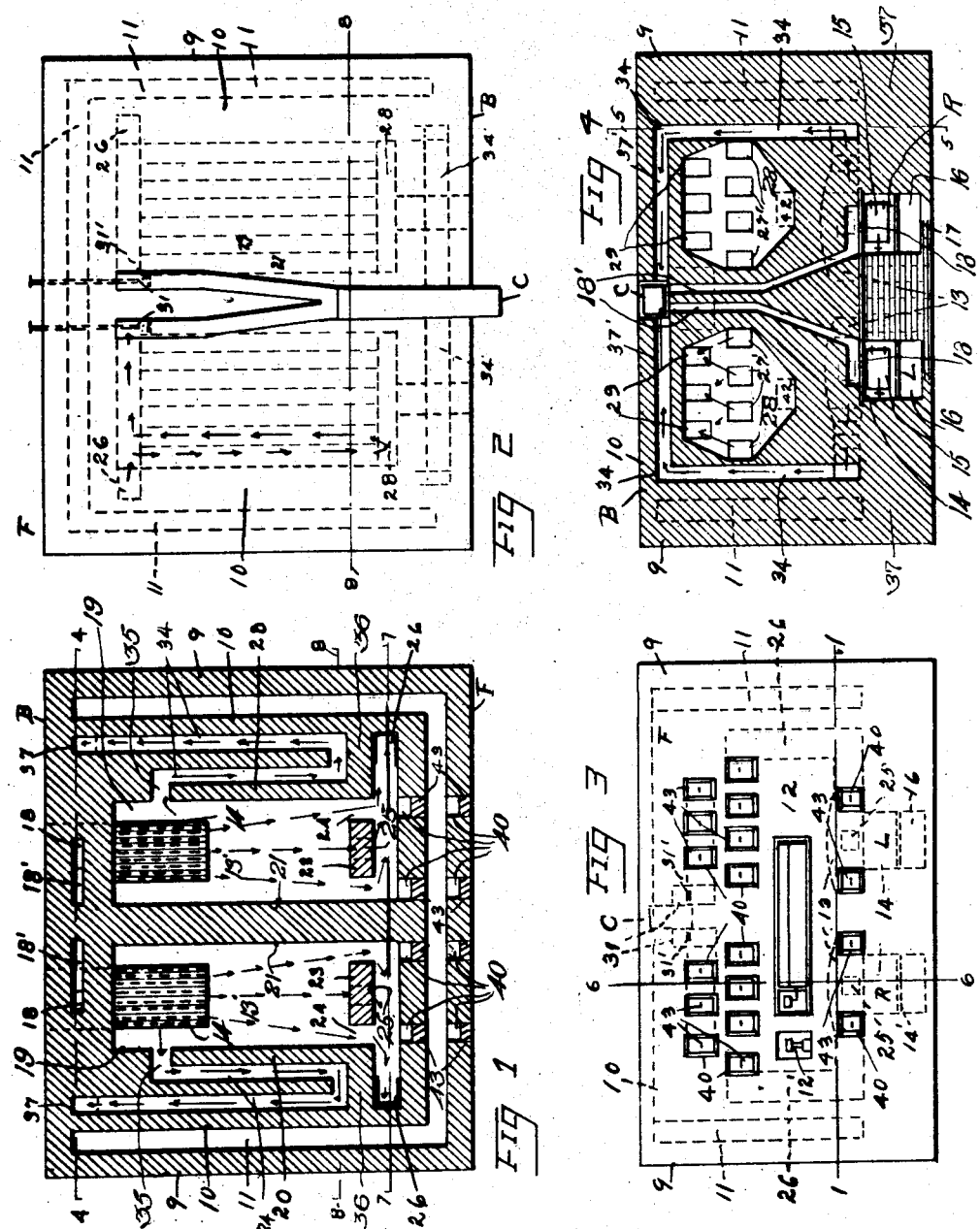

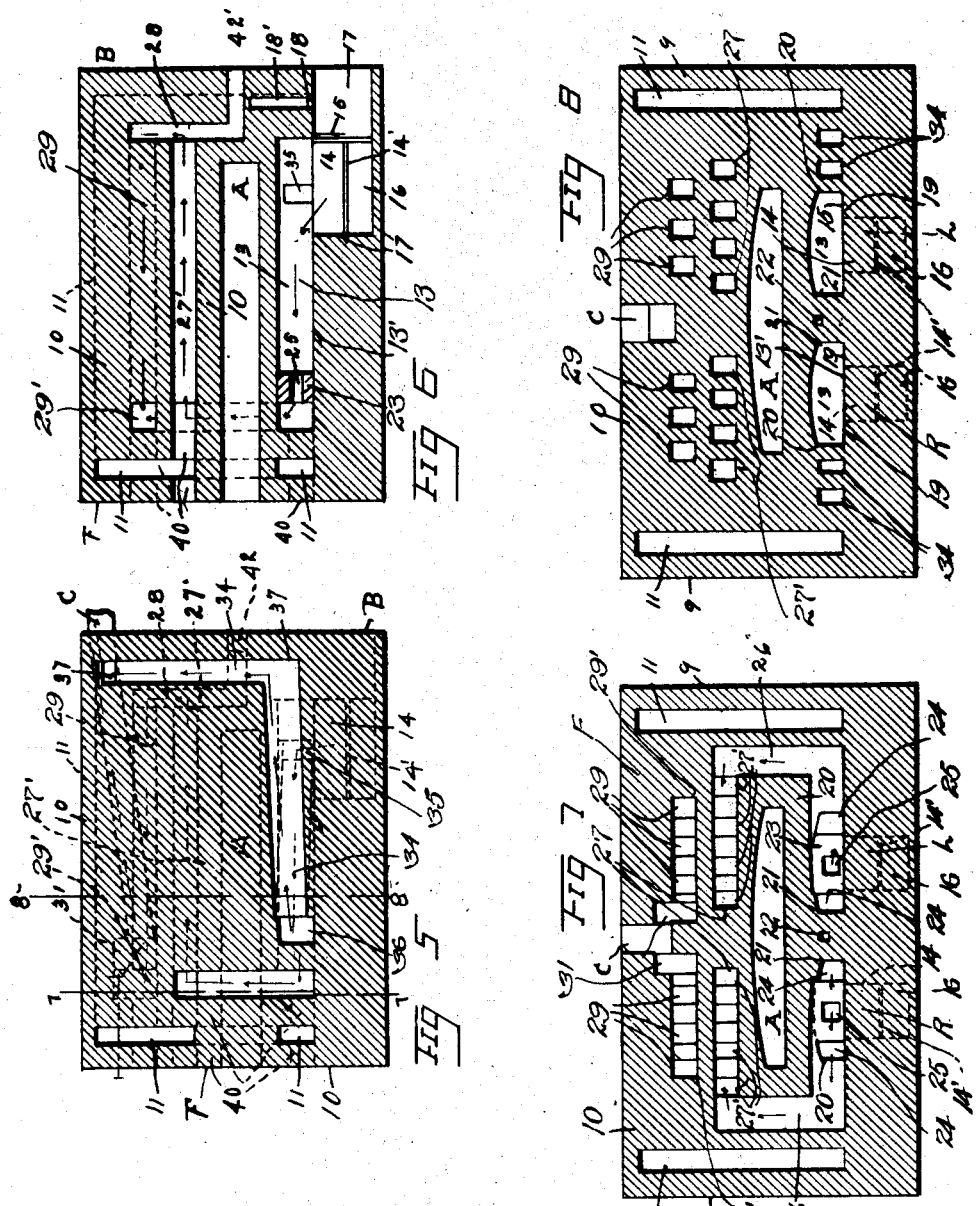

Patented Sept. 15, 1925.

1,553,870

UNITED STATES PATENT OFFICE.

MILIVOJ MARTINOV, OF SALT LAKE CITY, UTAH.

TWIN-FURNACE BAKER'S OVEN.

Application filed January 16, 1924. Serial No. 686,524.

*To all whom it may concern:*

Be it known that I, MILIVOJ MARTINOV, a citizen of the United States, residing at Salt Lake City, in the county of Salt Lake and State of Utah, have invented a new and useful Twin-Furnace Baker's Oven, of which the following is a specification.

This invention relates to improvements in ovens used by bakers in baking the dough of bread and cake. And has for one of its objects to provide a baker's oven with two furnaces within the oven wall, with flues attached thereto so the products of combustion may circulate through the oven wall in such a manner to give an even temperature to the wall and oven to bake the dough within the oven.

Another object of this invention is to provide a baker's oven with a right and left furnace, whereby one half of the oven can be used for baking by using one furnace, and the other furnace not used, thus making a saving in fuel in the baking of small lots of dough.

Another object of this invention is to provide a baker's oven with a combustion chamber so constructed that a very small grate surface is required to hold the fuel for the combustion to supply the heat necessary for the baking of the dough within the oven.

Another object of this invention is to provide a baker's oven with a furnace with obstruction walls therein having opening therethrough to prevent the rapid escape of the heat units from the combustion chamber.

Another object of this invention is to provide a baker's oven furnace with a side flue passage within the side wall of the furnaces to carry away all gases from the products of combustion within the furnace when the damper to the main flues are closed.

With these and other objects in view my invention consists of the following arrangement and construction of parts, to be hereinafter described and illustrated in the drawings forming part of this specification in which similar letters and numerals refer to like parts throughout the several views of the drawings, in which;

Figure 1 is a view on line 1—1 of Fig. 3, showing the furnaces and walls thereof in section.

Fig. 2 is a plan view of the oven wall showing the flues from each furnace entering the smoke stack.

Fig. 3 is a front view of the oven wall showing the oven opening and flue clean out holes therein.

Fig. 4 is a view on line 4—4, Fig. 1, showing the back end of the main flues entering the clean out hole, and the smoke flue from the top of the fire door to the stack.

Fig. 5 is a side view of the furnace on line 5—5 Fig. 4, showing the side and front flues.

Fig. 6 is a side view on line 6—6, Fig. 3, showing the movements of the products of combustion through the oven wall and around the oven.

Fig. 7 is a front view on line 7—7, Figs. 1 and 5, showing the baking oven and the flues as they lead from the furnaces.

Fig. 8 is a view through 8—8, Figs. 1, 2 and 5, showing the lay of the openings in the oven wall.

In describing my invention, similar parts in each furnace will show the same reference numeral.

F represents the front of the furnace or oven wall, B the back end of the furnace or oven wall, R the right furnace, L the left furnace, A the oven within the oven wall and C the smoke stack.

The oven A is surrounded by the main wall 10 which in turn is surrounded on each side and in front by another wall 9. The wall 9 is placed a distance from the wall 10 to allow the forming of an air space 11 between said walls. Under the baking oven A are placed two furnaces R and L and are known as twin furnaces.

Each of the furnaces R and L are provided with a combustion chamber 13 having a small fire box 14 therein. This fire box is about one half the width of the combustion chamber and about one fourth the length, this making the fire box less than one half the size of the ordinary fire box now used.

The fire box 13 is provided with a grate surface 14′, a fire door 15 and an ash pit 16. The grate 14′ and the fire door 15 are placed a distance forward from the out side face of the back end B within the fire box opening 17 this leaving a space of about two feet from the out side wall to the fire door. Over the top of this space is placed a plate of metal with a hole 18 therein over which sets the opening for the flue 18′. This flue 18′ is for carrying away all gases that escape from the opening of the fire door 15 and discharge them at the upper end into the smoke stack C. This flue is built within the wall of the oven 10 and runs upward from the top of the fire door to the stack.

Each of the combustion chambers are provided with a floor 13' which is level with the top of the fire box 14 and extends forwardly and sidewise of said fire box, thus leaving a level space 19 on the floor between the fire box and the side walls of the combustion chamber.

From the floor of the combustion chamber 13 rises the outer wall 20 and the inner wall 21 of the combustion chamber. The inner wall 21 is the dividing wall between the right and left furnace. From the top of said walls an arch is formed in the oven wall and extending across the combustion chamber from wall to wall. The wall 21 has an air opening 22 placed lengthwise therein. In small ovens this opening is omitted.

The combustion chamber 13 is provided with a front wall 23 having openings 24 therein placed at the side walls and another opening 25 placed in the center thereof to allow the gases of combustion to pass from the combustion chamber to the flue 26.

The front wall 23 also is an obstruction wall to prevent the rapid escape of the heat units from the combustion chamber.

The flue 26 enters in to a transverse manifold flue 27. From the manifold flue 27 and running rearwardly of the oven wall 10 are a number of flues 27' which enter at the rear end into a dirt or soot chamber 28. From the soot chamber 28 and above the flues 27' are another number of flues 29 which run forwardly of the oven wall 10 and enter into another manifold flue 29' which in turn enters the damper case 31. The damper case 31 has a damper therein, said damper having a handle thereon, said handle for operating said damper in controlling the draft of said flues in passing from the combustion chamber to the smoke stack.

From the damper case the gases enter the flue 30 which discharges them into the main smoke stack C.

The outside walls of the combustion chambers are provided with a longitudinal flue 34 which opens into the combustion chamber at 35. The flue 34 extends inwardly and then forwardly for a distance to the wall at 36 and then turning outwardly and then rearwardly to the rear of the oven wall 37 and then upwardly into the stack C through the horizontal flue 37'.

The oven wall 10 is provided with a number of openings 40 in the front thereof. These openings are provided with plugs or doors 43. Through these openings after the plugs have been removed a hoe is placed to clean out the flues of said oven wall. As the flues are cleaned the dirt is pushed rearwardly into the dirt chamber 28. After the flues have been cleaned and the dirt is placed in the dirt chamber 28 the plug 42 is removed from the back of the oven wall and the dirt is then drawn from the dirt chamber by means of a hoe operating in said plug hole 42'.

The bake oven A within the oven wall 10 is constructed in the usual manner of the standard ovens with a door to open when the dough is to be placed therein and closed after the dough has been placed therein. Heat testing devices are also placed near the door as shown at 12'.

Having described my invention I will now illustrate the operation and travel of the gases and the principles of combustion involved.

To generate the heat to warm the oven A fuel is placed upon the grate 14' and from the combustion thereof the gases pass from the fuel to the combustion chamber, and at the forward end thereof strike the front wall 23 and are then rebounded backward a little thence are drawn through the openings 24 and 25 to the main flue passage 26 where they are still in a high heated condition and are then carried through the flue 26 to the manifold flue 27 and distributed through the flues 27' and then through the upper set of flues and thence out of the stack.

The flue 34 in the outside of the furnace wall is for the purpose of carrying off gases that may be formed therein when the damper is closed over the main flue and preventing the escape of the gases through the damper to the stack.

The movement of the gases in the flues are indicated by arrows within said flues.

The escaping gas of combustion is maintained at the highest degree of temperature generated within the combustion chamber in passing from the furnace through the flues to the stack.

With my improved baker's oven with the twin furnaces thereunder, it is simple in construction and operation. Is perfectly adapted to accomplish the results of which it is intended, and is also inexpensive in construction. And by the use thereof a saving in fuel is accomplished by the perfect combustion of the carbons in the furnace chamber that escape in the form of smoke. All the air required for this combustion enters the furnace through the grates and furnace door.

Having described my invention what I claim as new and desire to secure by Letters Patent, is:

A baker's oven comprising an outer wall and inner wall with openings between said walls, two furnaces placed under said oven within the inside wall, said furnaces being provided with a rectangular fire box having a grate therein and an ash pit thereto, said fire box having a fire door attached thereto, a combustion chamber for said furnaces, said combustion chamber having a floor side walls and an arch therein, an opening in the outside wall of said combustion chamber, said opening entering into a flue in the side wall of said oven and at one side of the furnace and oven, said flue running forwardly thence outwardly thence rearwardly thence upwardly thence inwardly into the stack, other flues placed within said oven wall in such a manner as to carry the heat from the products of combustion through said oven wall for heating the baking oven within said wall and means for regulating the draft within said furnace.

In witness whereof I affix my signature.

MILIVOJ MARTINOV.